(12) United States Patent
Chabaille et al.

(10) Patent No.: US 11,168,886 B2
(45) Date of Patent: Nov. 9, 2021

(54) INJECTOR NOSE FOR TURBOMACHINE INCLUDING A SECONDARY FUEL SWIRLER WITH CHANGING SECTION

(71) Applicant: SAFRAN AIRCRAFT ENGINES, Paris (FR)

(72) Inventors: Christophe Chabaille, Paris (FR); Clément Yves Emile Bernard, Paris (FR); Sébastien Christophe Loval, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/728,188

(22) Filed: Dec. 27, 2019

(65) Prior Publication Data

US 2020/0208841 A1    Jul. 2, 2020

(30) Foreign Application Priority Data

Dec. 27, 2018  (FR) ...................... 1874259

(51) Int. Cl.
*F23R 3/28* (2006.01)
*F02C 7/22* (2006.01)
*F23D 11/38* (2006.01)

(52) U.S. Cl.
CPC ................. *F23R 3/28* (2013.01); *F02C 7/22* (2013.01); *F23D 11/383* (2013.01)

(58) Field of Classification Search
CPC .... F23R 3/28; F23R 3/386; F23R 3/30; F02C 7/22; F02C 7/2365
See application file for complete search history.

(56) References Cited

U.S. PATENT DOCUMENTS 6,688,534 B2 * 2/2004 Bretz ................... F23D 11/107
239/135
8,347,631 B2 * 1/2013 Bailey ..................... F23R 3/283
60/740

(Continued)

FOREIGN PATENT DOCUMENTS

EP  1770333 A1  4/2007
FR  3011318 A1  4/2015

(Continued)

OTHER PUBLICATIONS

Preliminary Search Report issued in French Patent Application No. 1874259 dated Oct. 3, 2019.

*Primary Examiner* — Ehud Gartenberg
*Assistant Examiner* — Roberto Toshiharu Igue
(74) *Attorney, Agent, or Firm* — Pearne & Gordon LLP (57) ABSTRACT

An injector nose for a turbomachine includes a primary fuel circuit terminated by a fuel ejection nozzle defining an injection axis (44), and a secondary fuel circuit (64) comprising a secondary fuel swirler (114) formed of swirler channels (112) opening into a terminal fuel ejection portion (68) of annular shape arranged around the fuel ejection nozzle. Each swirler channel (112) has a passage section which decreases in a direction going from an upstream end (111) to a downstream end (115) of the swirler channel (112). The reduction of the passage section of the swirler channels (112) makes it possible to increase the head loss between the inlet and the outlet of the secondary fuel swirler (114) and thus notably to accelerate the fuel within the secondary fuel swirler, while allowing lower fuel flow rates.

9 Claims, 5 Drawing Sheets (56) References Cited

U.S. PATENT DOCUMENTS

| | | | |
|---|---|---|---|
| 10,041,411 B2 | 8/2018 | Chabaille et al. | |
| 10,443,850 B2 | 10/2019 | Bourgois et al. | |
| 10,495,312 B2 | 12/2019 | Rodrigues et al. | |
| 2016/0010855 A1* | 1/2016 | Myers | F23D 11/24 |
| | | | 239/403 |
| 2016/0018110 A1* | 1/2016 | Stuttaford | F23R 3/002 |
| | | | 60/776 |
| 2016/0237911 A1* | 8/2016 | Chabaille | F23R 3/343 |
| 2017/0184307 A1* | 6/2017 | Patel | F23R 3/12 |
| 2017/0234539 A1 | 8/2017 | Chabaille et al. | |
| 2018/0313542 A1* | 11/2018 | Leparoux | F23R 3/28 |
| 2019/0257251 A1 | 8/2019 | Godel et al. | |
| 2019/0292988 A1 | 9/2019 | Chabaille | |
| 2019/0292990 A1 | 9/2019 | Chabaille et al. | |
| 2019/0376690 A1* | 12/2019 | Niemeyer | F23R 3/286 |

FOREIGN PATENT DOCUMENTS

| | | | | |
|---|---|---|---|---|
| GB | 2455729 | * | 6/2009 | F02C 7/22 |
| WO | 0019146 A2 | | 4/2000 | |

* cited by examiner

INJECTOR NOSE FOR TURBOMACHINE INCLUDING A SECONDARY FUEL SWIRLER WITH CHANGING SECTION

This application claims priority from French Patent Application 18 74259 filed Dec. 27, 2018, the entire content of which is incorporated by reference herein.

TECHNICAL FIELD

The invention relates to the general field of fuel injectors that equip the combustion chamber of a turbomachine, in particular a turbine engine of the type intended for the propulsion of aircraft.

PRIOR ART

The combustion chambers of turbomachines are in general equipped with fuel injectors associated with pre-mixing systems, commonly designated "injection systems", comprising in general one or more swirlers (axial and/or radial), also designated "vortexers", which use the air coming from a compressor arranged upstream of the combustion chamber to atomise fuel in the combustion chamber.

Two categories of injectors are currently used: aerodynamic injectors, which mainly use the pressure and the velocity of the air at the compressor outlet to rotate the fuel at the outlet of the injector nose, and aeromechanical injectors which mainly use the pressure of the fuel inside the injector nose to rotate and atomise the fuel.

Furthermore, injector noses with double fuel circuit include a primary fuel circuit, also called pilot circuit, comprising a primary fuel swirler supplying a primary injector (also called pilot injector) arranged on an axis of the injector nose, and a secondary fuel circuit, also called main circuit, comprising a secondary fuel swirler supplying a secondary injector (also called main injector) arranged around the primary injector. It may be aeromechanical injectors or a combination of a primary aeromechanical injector and a secondary aerodynamic injector.

The use of this type of injector has developed to satisfy ever more stringent norms in terms of pollutant emissions.

The primary circuit is in general intended to supply the combustion chamber with fuel at all regimes, in particular during ignition and winding phases, that is to say propagation of the flame to the neighbouring sectors.

The secondary circuit is intended to supply the engine at regimes ranging from cruise flight to take off.

Fuel swirlers are preponderant parts in the capacity of the injector to guarantee correct atomisation of the fuel jet and a suitable hydraulic characteristic.

These considerations make desirable the development of a new fuel injector nose having improved performances, notably in terms of pluviometry and granulometry, and capable of lower atomisation flow rates.

DESCRIPTION OF THE INVENTION

The invention proposes to this end an injector nose for turbomachine, including a primary fuel circuit terminated by an ejection nozzle centred along an injection axis, and a secondary fuel circuit comprising a secondary fuel swirler formed of swirler channels opening into a terminal ejection part of annular shape centred along the injection axis and arranged around the central ejection nozzle.

According to the invention, each of the swirler channels has a passage section which decreases in a direction going from an upstream end to a downstream end of the channel.

The reduction in the passage section of each of the swirler channels makes it possible to increase the head loss between the inlet and the outlet of the secondary fuel swirler and thus notably to accelerate the fuel within the secondary fuel swirler, while allowing lower fuel flow rates.

Preferably, each swirler channel extends along a respective plane forming, with the injection axis, an angle comprised between 40 degrees and 60 degrees.

Preferably, each swirler channel is curved in the corresponding plane.

Preferably, the secondary fuel circuit comprises a secondary plenum chamber of annular shape connected to the respective upstream ends of the swirler channels.

Preferably, the secondary fuel circuit comprises secondary connection channels connecting a tubular channel, centred along the injection axis, to the secondary plenum chamber.

Preferably, the injector nose further includes an air inlet swirler supplying an annular air injection channel arranged radially inwards with respect to the terminal fuel ejection portion and cooperating with the terminal fuel ejection portion to form a secondary aerodynamic injector.

Preferably, the terminal fuel ejection portion is delimited externally by an outer lip, and is delimited internally by an inner lip which separates the terminal fuel ejection portion from the annular air injection channel.

Preferably, the air inlet swirler is formed of air inlet channels having respective inlets opening into a radially outer wall of the injector nose, and respective outlets opening into the annular air injection channel.

The invention also relates to an injection module for turbomachine, including an injection system, and an injector nose of the type described above, in which the injection system comprises, from upstream to downstream, a bushing in which is mounted the injector nose, at least one air admission swirler emerging downstream of the injector nose, and a bowl.

The invention also relates to a turbomachine, including at least one injector nose of the type described above, or at least one injection module of the type described above.

BRIEF DESCRIPTION OF THE DRAWINGS

The invention will be better understood, and other details, advantages and characteristics thereof will become clear on reading the following description given as a non-limiting example and by referring to the appended drawings, in which.

DETAILED DESCRIPTION OF PREFERRED EMBODIMENTS

Figure 1:
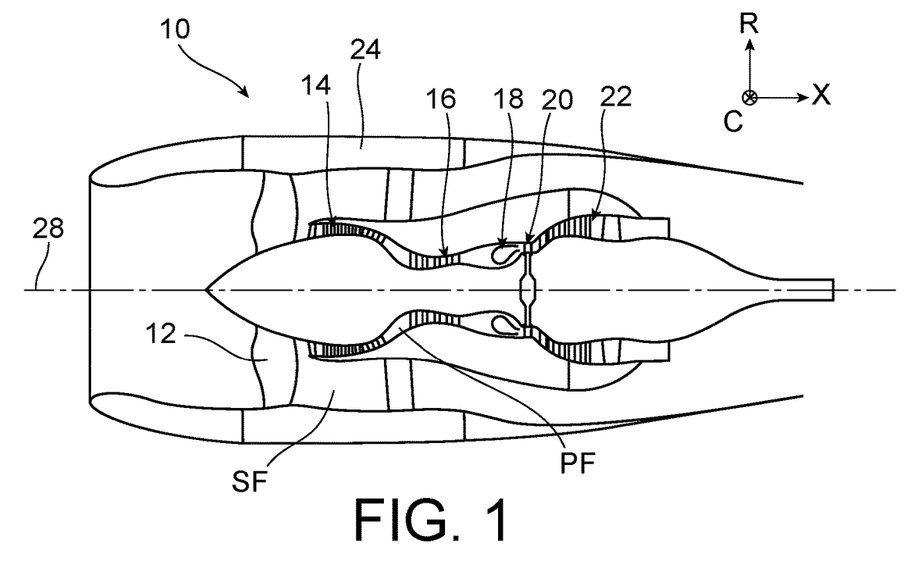
FIG. 1 is a schematic view in axial section of a turbomachine according to a preferred embodiment of the invention.

FIG. 1 illustrates a turbomachine 10 for aircraft of known type, generally speaking comprising a fan 12 intended for the suction of an air stream dividing downstream of the fan into a primary stream circulating in a primary stream flow channel, hereafter designated primary flow path PF, within a heart of the turbomachine, and a secondary stream circumventing this heart in a secondary stream flow channel, hereafter designated secondary flow path SF.

The turbomachine is for example of the double stream and double body type. The heart of the turbomachine thus comprises, generally speaking, a low pressure compressor 14, a high pressure compressor 16, a combustion chamber 18, a high pressure turbine 20 and a low pressure turbine 22.

The respective rotors of the high pressure compressor and the high pressure turbine are connected by a so-called "high pressure" shaft, whereas the respective rotors of the low pressure compressor and the low pressure turbine are connected by a so-called "low pressure" shaft, in a well known manner.

The turbomachine is shrouded by a nacelle 24 surrounding the secondary flow path SF. Furthermore, the rotors of the turbomachine are rotationally mounted around a longitudinal axis 28 of the turbomachine.

Throughout this description, the longitudinal direction X is the direction of the longitudinal axis 28.

In addition, in a first part of this description, the radial direction R is at all points a direction orthogonal to the longitudinal axis 28 and passing through the latter, and the circumferential or tangential direction C is at all points a direction orthogonal to the radial direction R and to the longitudinal axis 28. The terms "inner" and "outer" refer respectively to a relative proximity, and a relative distancing, of an element with respect to the longitudinal axis 28. Furthermore, the directions "upstream" and "downstream" are defined with reference to the general direction of flow of the gases in the primary PF and secondary SF flow paths of the turbomachine.

Figure 2:
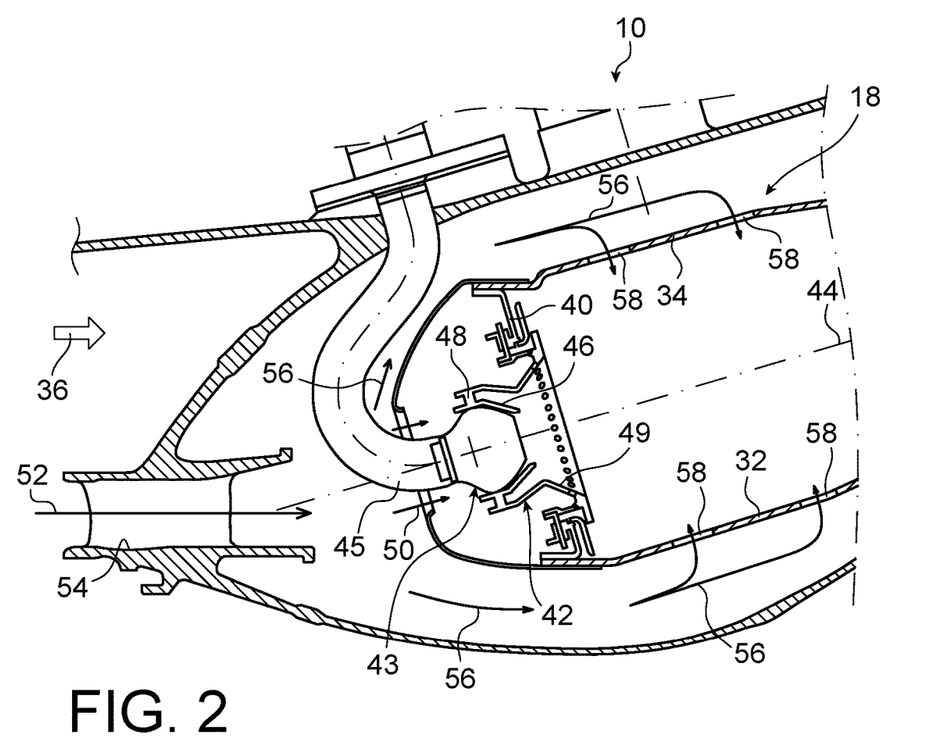
FIG. 2 a schematic view in axial section of a combustion chamber of the turbomachine of FIG. 1.

FIG. 2 represents the combustion chamber 18 of the turbomachine 10 of FIG. 1 and its immediate environment.

Conventionally, this combustion chamber, which is for example of annular type, includes two coaxial annular walls, respectively radially inner 32 and radially outer 34, which extend from upstream to downstream, along the direction 36 of flow of the primary gas stream in the turbomachine, around the longitudinal axis 28 of the turbomachine. These inner 32 and outer 34 annular walls are connected together at their upstream end by a chamber bottom annular wall 40 which extends substantially radially around the longitudinal axis 28. This chamber bottom annular wall 40 is equipped with injection systems 42 distributed around the longitudinal axis 28, of which one is visible in FIG. 2, each receiving an injector nose 43 mounted at the end of an injector vent 45, to enable the injection of a premix of air and fuel centred along a respective injection axis 44.

More precisely, each injection system 42 comprises a bushing 46, in which the corresponding injector nose 43 is mounted slidably to enable differential thermal expansions while in operation.

In the example illustrated, the bushing 46 internally delimits a single air admission swirler 48, for example of the axial type, formed within the injection system 42.

Each injection system 42 further comprises a diverging bowl 49 arranged at the outlet of the air admission swirler 48 and opening into the combustion chamber 18.

The assembly formed of an injection system 42 and the corresponding injector nose 43 constitutes an injection module, in the terminology of the present invention.

In operation, a part 50 of an air stream 52 from a diffuser 54 and coming from the high pressure compressor 16 supplies the injection systems 42, whereas another part 56 of the air stream 52 supplies air inlet orifices 58 arranged in the walls 32 and 34 of the combustion chamber, in a well known manner.

In the remainder of the present description, with reference to FIGS. 3 to 9, the radial direction R' is at all points a direction orthogonal to the injection axis 44 and going through the latter, and the circumferential or tangential direction C' is at all points a direction orthogonal to the radial direction R' and to the injection axis 44. The terms "inner" and "outer" refer respectively to a relative proximity, and a relative distancing, of an element with respect to the injection axis 44. Furthermore, the directions "upstream" and "downstream" are defined with reference to the general direction of the flow of air and fuel in the injector nose 43. In addition, a transversal plane is defined as a plane orthogonal to the injection axis 44, whereas an axial plane is defined as a plane containing the injection axis 44.

FIGS. 3 to 9 illustrate in greater detail an injector nose 43 according to a preferred embodiment of the invention.

The injector nose 43 comprises a body 60, preferably one-piece, including an end fitting 61 (FIGS. 3 and 5) through which the injector nose 43 is intended to be connected to an injector vent 45 as in FIG. 2.

Figure 3:
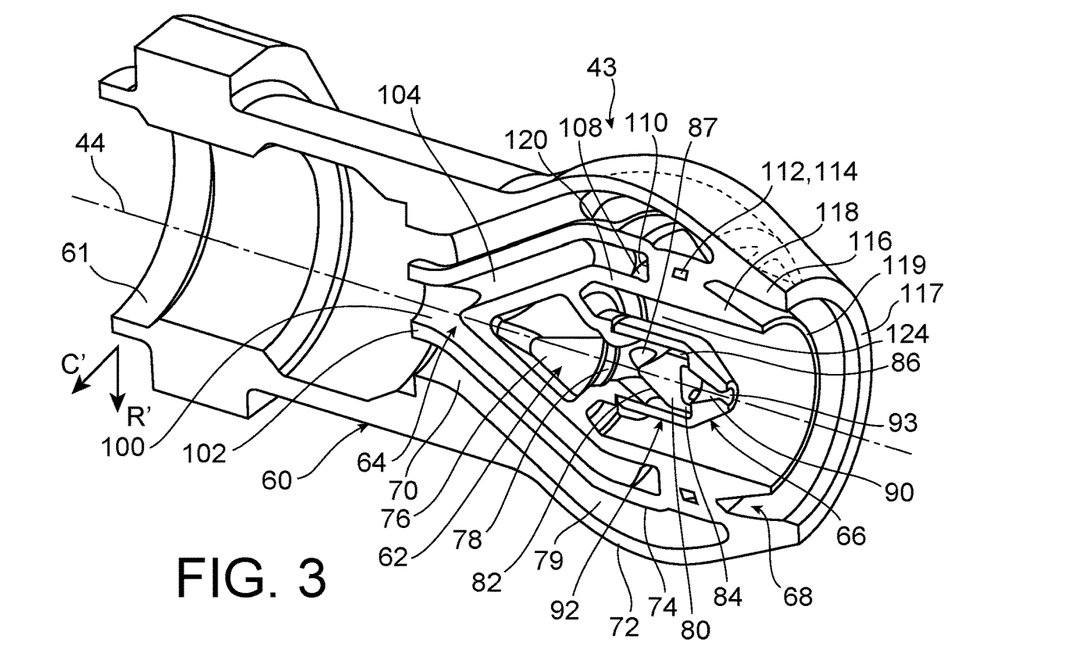
FIG. 3 is a schematic view in perspective and in axial section of an injector nose equipping the combustion chamber of FIG. 2.

Within the body 60 are arranged two fuel circuits, namely a primary circuit 62 and a secondary circuit 64 (FIG. 3).

The primary circuit 62 terminates by a central fuel ejection nozzle 66 of aeromechanical type, whereas the secondary circuit 64 has a terminal fuel ejection portion 68 of aerodynamic type arranged around the fuel ejection nozzle 66 (FIGS. 3-6), as will become clearer hereafter.

Figure 8:
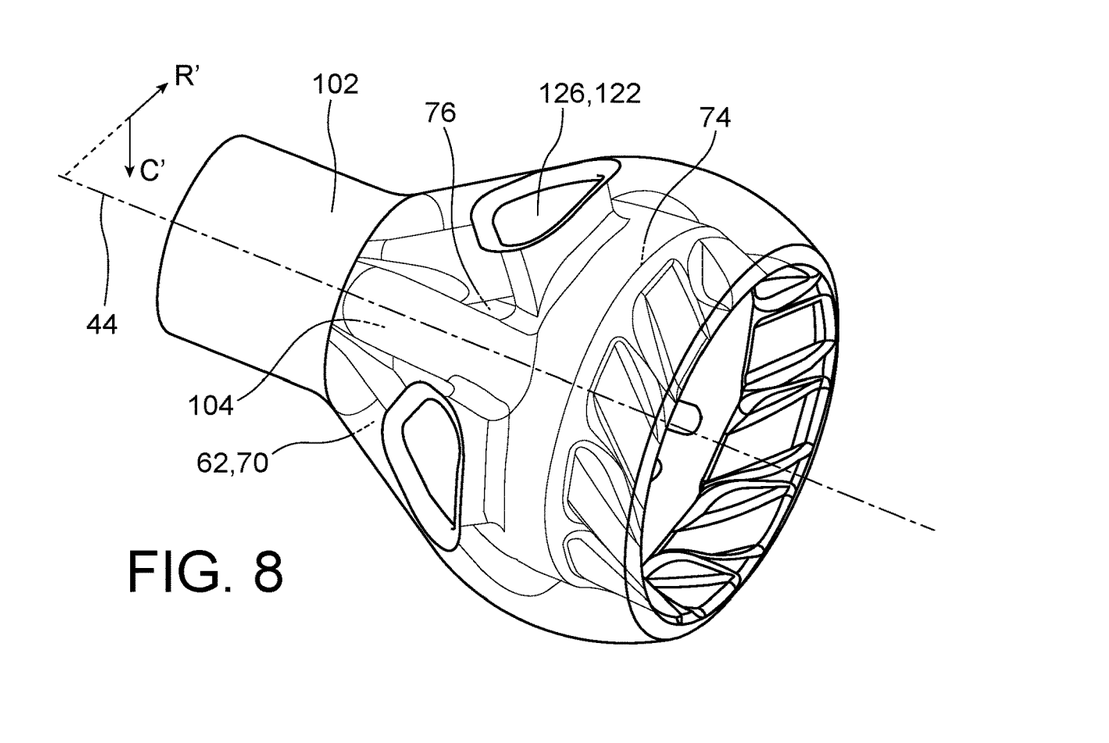
FIG. 8 is a partial schematic view in perspective of the primary fuel circuit of the injector nose of FIG. 3.

The primary circuit 62 comprises an annular channel 70 defined between a radially outer wall 72, of globally annular shape, of the body 60 (FIGS. 3-7), which externally delimits the latter, and an inner envelope 74 globally annular and of complex shape, represented isolated in FIG. 8.

The primary circuit 62 further comprises primary connection channels 76 (FIGS. 3, 4 and 8) which connect the annular channel 70 to an inlet chamber 78 (FIGS. 3 and 4) of the fuel ejection nozzle 66. The primary connection channels 76 are for example four in number and are preferably regularly distributed around the injection axis 44.

Figure 4:
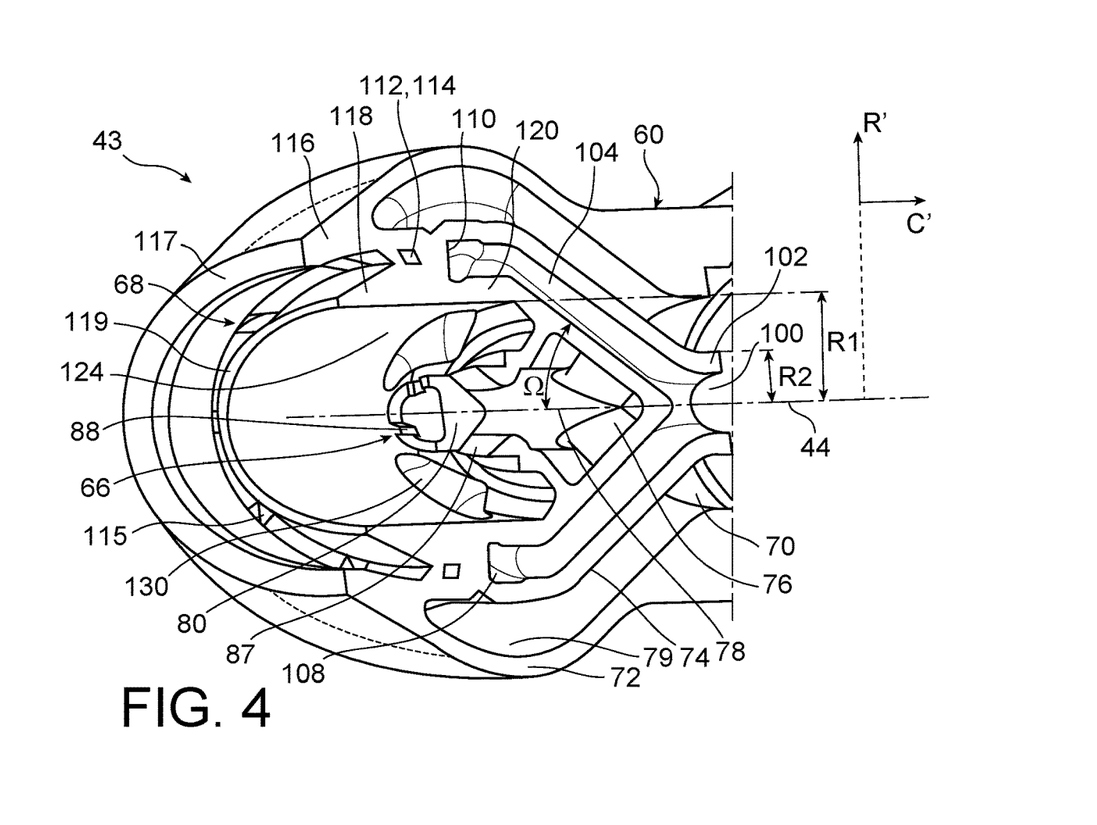
FIG. 4 is a schematic view in perspective and in axial section of the injector nose of FIG. 3 without a terminal end fitting of a primary fuel circuit, and seen under a different angle.
Figure 5:
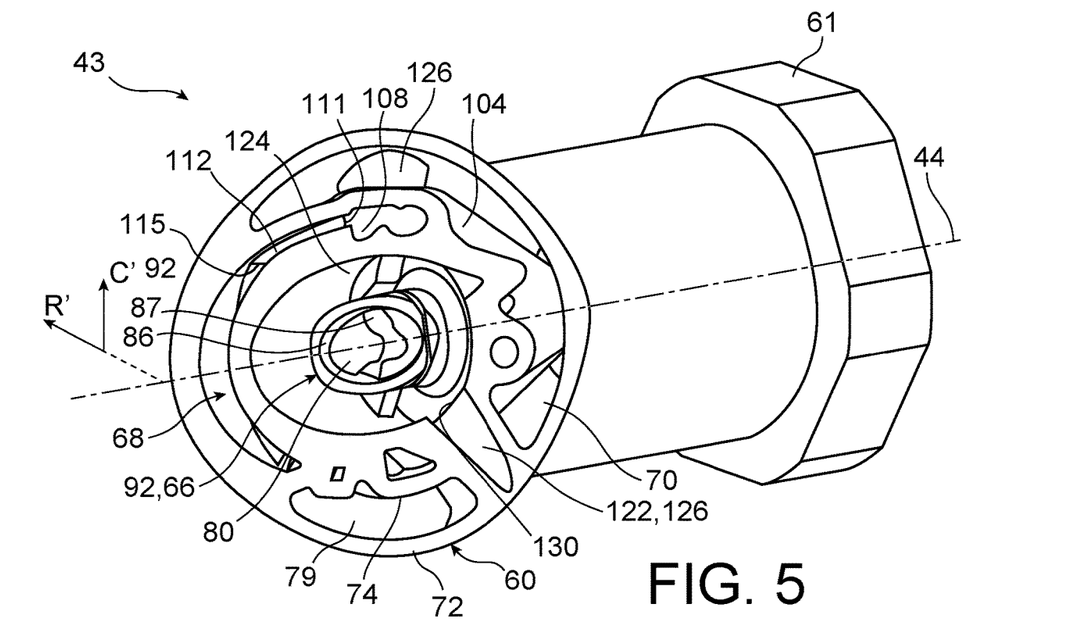
FIG. 5 is a schematic view in perspective and in oblique section of the injector nose of FIG. 3.

The inlet chamber 78 is arranged in the injection axis 44, radially inwards with respect to the annular channel 70.

The primary connection channels 76 thus have respective inlets connected to the annular channel 70, and respective outlets connected to the inlet chamber 78. The respective inlets of the primary connection channels 76 are arranged radially outwards with respect to their respective outlets. In the example illustrated, the primary connection channels 76 extend along respective directions substantially orthogonal to the injection axis 44, for example substantially radial.

The annular channel 70 extends downstream beyond the primary connection channels 76 so as to form a terminal annular chamber 79.

The fuel ejection nozzle 66 comprises a core 80 which forms part of the body 60 and which is centred on the injection axis 44 and arranged at a downstream end of the inlet chamber 78 (FIGS. 3 to 6). The core 80 has an upstream part 82 which extends downstream into an annular surface 84 which internally delimits a primary plenum chamber 86 of annular shape within the fuel ejection nozzle 66. Supply channels 87 inclined with respect to the injection axis 44 and with respect to the radial direction R' connect the inlet chamber 78 to the primary plenum chamber 86. Ortho-radial (FIGS. 4 and 6) injection channels 88, that is to say orthogonal to the injection axis 44 and not secant with the latter, connect a downstream end of the primary plenum chamber 86 to a converging vortex chamber 90 (FIG. 3). The orientation of the injection channels 88 makes it possible to favour the gyration of the fuel within the vortex chamber 90.

The primary circuit 62, and more particularly the fuel ejection nozzle 66, comprises a terminal end fitting 92 (FIGS. 3 and 5) which is mounted on a downstream end of the body 60 and which externally delimits the primary plenum chamber 86 and the vortex chamber 90. This terminal end fitting 92 comprises an upstream part of cylindrical revolution shape externally delimiting the primary plenum chamber 86, and a downstream part of truncated cone shape externally delimiting the vortex chamber 90 and terminated by a fuel ejection orifice 93 (FIG. 3) intended to diffuse in the form of spray fuel coming from the vortex chamber 90.

Figure 9:
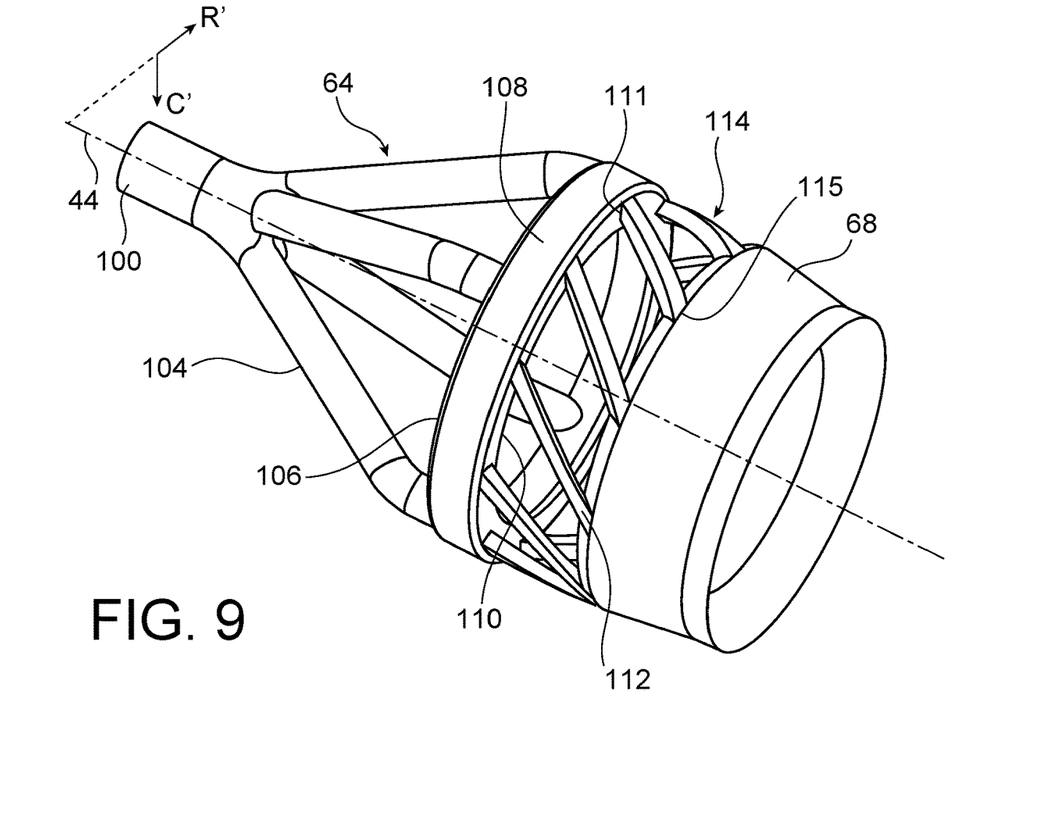
FIG. 9 is a partial schematic view in perspective of a secondary fuel circuit of the injector nose of FIG. 3.

The secondary circuit 64 will now be described with reference to FIGS. 3-6 and 9. FIG. 9 shows the inner volume of the secondary circuit 64, that is to say the space occupied by the fuel while in operation. The walls delimiting the different parts of the secondary circuit 64 that are going to be described are visible as reliefs within the inner envelope 74 of the primary circuit 62, visible in FIG. 8.

The secondary circuit 64 comprises a tubular channel 100 (of which only one terminal part is represented in the figures), centred on the injection axis 44, and externally delimited by a cylindrical wall 102 (of which only one terminal part is represented in the figures), which internally delimits an upstream part of the annular channel 70 of the primary circuit (and which thus forms an upstream part of the aforesaid inner envelope 74).

As appears more clearly in FIG. 9 which represents the secondary circuit 64 isolated from the remainder of the injector nose, the tubular channel 100 divides, at its downstream end, into four secondary connection channels 104 regularly distributed around the injection axis 44 and each shaped to move away from the injection axis 44 in the direction going from upstream to downstream.

Each of the secondary connection channels 104 is for example inscribed in a respective axial plane. The secondary connection channels 104 have respective downstream ends emerging onto an upstream end surface 106 of a secondary plenum chamber 108 of annular shape, centred on the injection axis 44. This secondary plenum chamber 108 is delimited downstream by a downstream end surface 110 into which opens the respective upstream ends 111 of swirler channels 112 forming a secondary fuel swirler 114.

Figure 6:
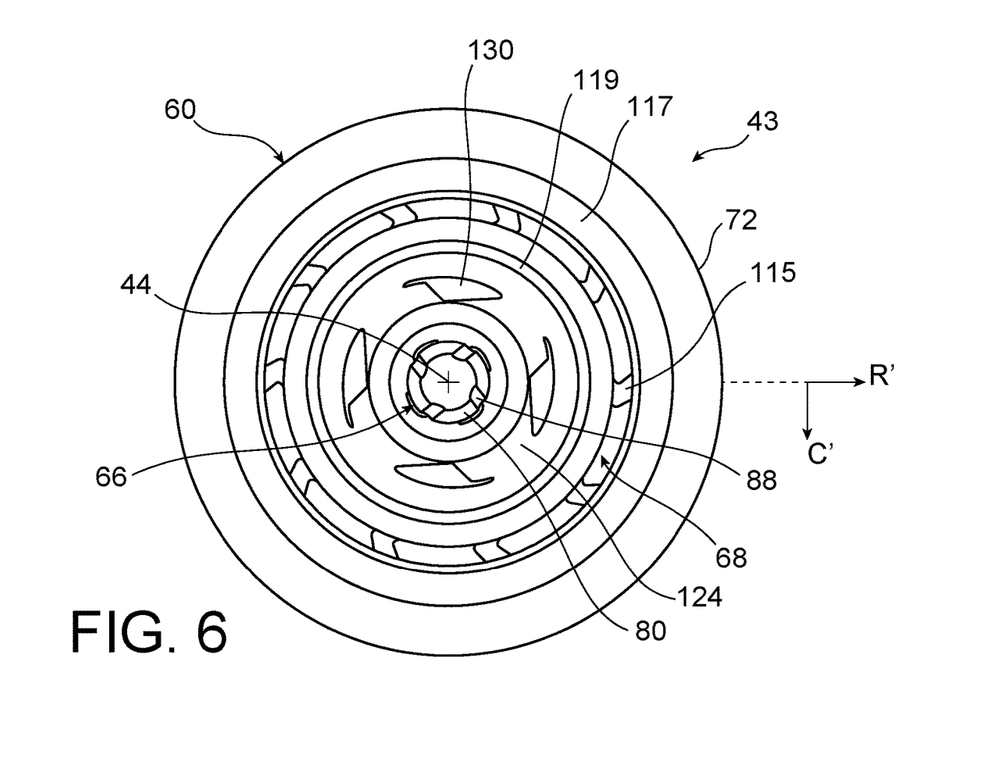
FIG. 6 is a schematic view of the injector nose of FIG. 3, seen facing from downstream.
Figure 7:
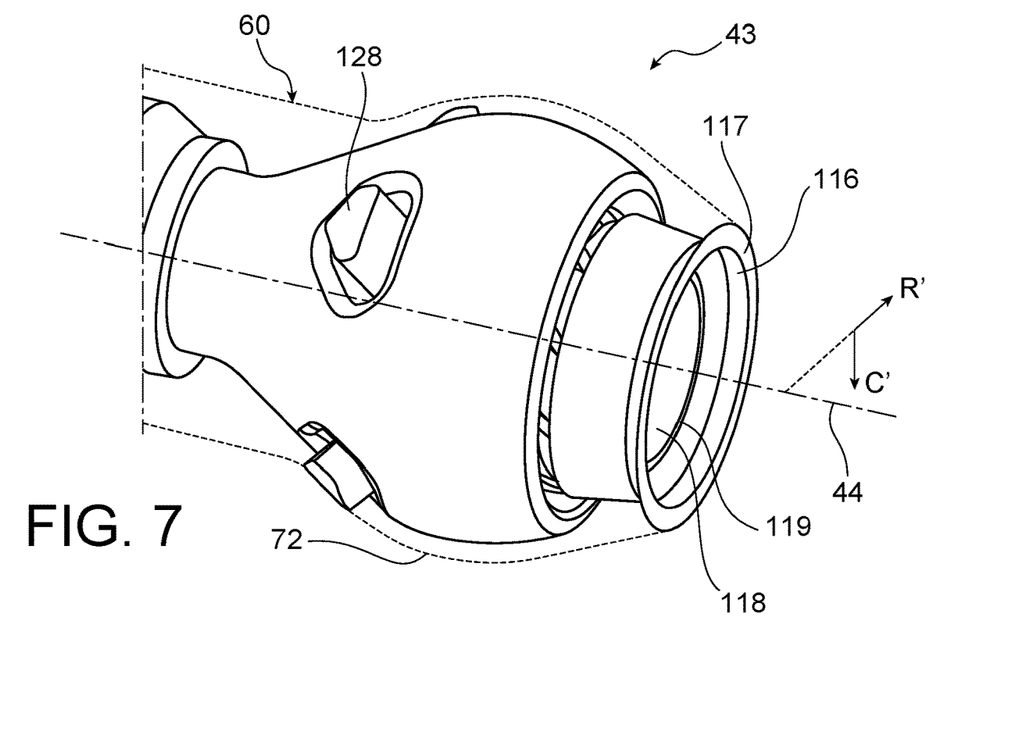
FIG. 7 is a schematic view in perspective of the injector nose of FIG. 3.

The swirler channels 112 have respective downstream ends 115 (FIGS. 4, 6 and 9) emerging into an annular space constituting the terminal ejection part 68 of the secondary circuit 64. As shown in FIGS. 3, 4 and 6, this annular space is delimited externally by an annular outer lip 116 of the body 60 having a free end 117, and is delimited internally by an annular inner lip 118 of the body 60 having a free end 119.

As shown in FIG. 4, the secondary plenum chamber 108 and the swirler channels 112 extend around an annular wall 120 which extends downstream while forming the inner lip 118, and which has an inner radius R1 which is for example greater than an outer radius R2 of the cylindrical wall 102 which internally delimits the upstream part of the annular channel 70 of the primary circuit.

The secondary connection channels 104 each form, with the injection axis 44, an angle θ which is preferentially comprised between 30 degrees and 60 degrees, and which is for example equal to 45 degrees (FIG. 4).

As will appear in FIG. 8, the secondary connection channels 104 delimit between them, two by two, spaces forming respectively the primary connection channels 76 belonging to the primary circuit 62.

Furthermore, as shown more clearly in FIGS. 3 and 8, the secondary fuel swirler 114 is surrounded by the terminal annular chamber 79 which extends the annular channel 70 of the primary circuit 62.

The injector nose 43 further integrates an air inlet swirler 122 (FIGS. 4, 5 and 8) and an annular air injection channel 124 cooperating with the terminal ejection part 68 of the secondary circuit 64 to form a secondary aerodynamic injector.

The air inlet swirler 122 is formed of air inlet channels 126, for example four in number, having respective inlets 128 (FIG. 7) opening through the outer wall 72 of the body 60, and respective outlets 130 (FIGS. 4-6) opening into the annular air injection channel 124, preferentially in a substantially orthoradial manner in order to favour the gyration of air around the injection axis 44.

The air inlet channels 126 extend through the annular channel 70 of the primary circuit 62, between the secondary connection channels 104 (FIG. 8).

The annular air injection channel 124 is externally delimited by the annular wall 120, and internally by the fuel ejection nozzle 66, notably by the terminal end fitting 92 (FIGS. 3 and 4).

It ensues in particular from what precedes that an upstream part of the primary circuit 62 housed in the injector nose 43, and formed in this case by the annular channel 70 and the terminal annular chamber 79, extends around the secondary circuit 64. This upstream part of the primary circuit 62 is externally delimited by the outer wall 72 of the body 60 of the injector nose, such that the upstream part of the primary circuit 62 extends onto the periphery of the injector nose.

Due to the fact that fuel circulates in the upstream part of the primary circuit 62 whatever the operating regime of the turbomachine, the upstream part of the primary circuit 62 thus makes it possible to ensure the thermal protection and the cooling of the injector nose 43.

In particular, the terminal annular chamber 79 makes it possible to ensure the effect of thermal protection and cooling of the injector nose 43 beyond the primary connection channels 76, in the downstream direction, and makes it possible in particular to ensure the thermal protection and the cooling of the secondary fuel swirler 114.

Figure 9A:
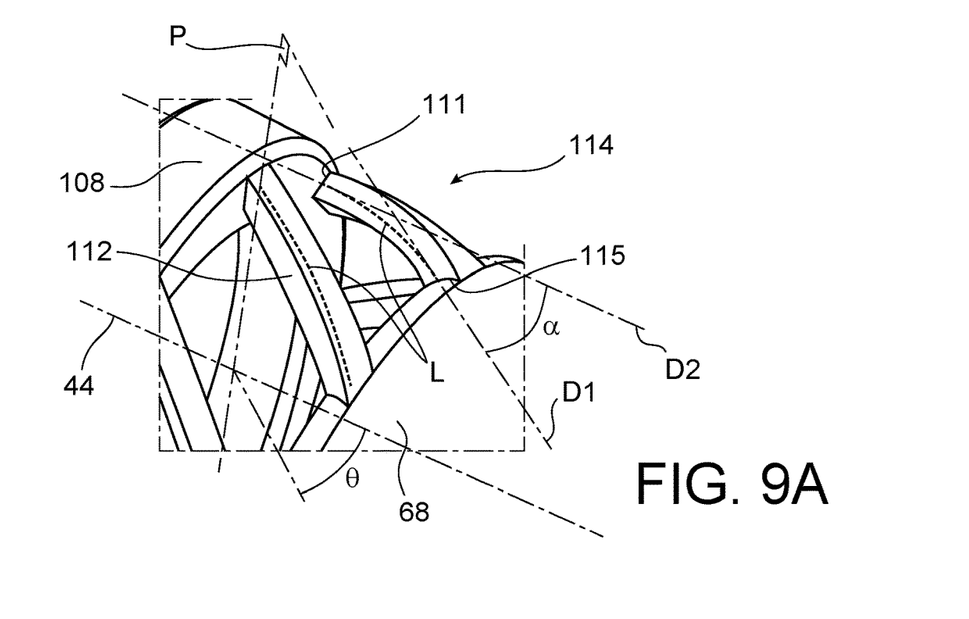
FIG. 9A is a larger scale view of a part of FIG. 9.

With reference to FIGS. 9 and 9A, the swirler channels 112 each extend along a respective plane P forming an acute angle θ with the direction D of the injection axis, preferentially comprised between 40 degrees and 60 degrees, and for example equal to 50 degrees.

According to a particularity of the invention, each of the swirler channels 112, forming the secondary fuel swirler 114, has a changing passage section, which decreases in the direction going from the upstream end 111 to the downstream end 115 of the channel. The reduction in the passage section between the upstream end and the downstream end of each of the swirler channels 112 is preferably comprised between 10 and 50 percent of the passage section at the level of the upstream end of the channel.

The reduction in the passage section of each of the swirler channels 112 makes it possible to increase the head loss between the inlet and the outlet of the secondary fuel swirler 114 and thus notably to accelerate the fuel within the secondary fuel swirler 114, while allowing lower fuel flow rates at equal pressure at the inlet of the secondary swirler.

The passage section at the inlet of each of the swirler channels 112 is for example equal to 0.2 mm².

In addition, each of the swirler channels 112 is curved in the corresponding plane P, such that a direction D1 tangential to a mean line L of the channel at the level of the downstream end 115 of the latter forms an angle α with a direction D2 tangential to the mean line L of the channel at the level of the upstream end 111 of the latter. The angle α is preferentially comprised between 5 degrees and 15 degrees, and is for example equal to 8 degrees. Due to its curvature, each of the swirler channels 112 extends substantially at a constant distance from the injection axis 44, from the upstream end to the downstream end of the channel 112.

It should be noted that the body 60 is preferably produced by additive manufacturing. In the example illustrated, this body 60 forms the whole of the injector nose 43 with the exception of the terminal end fitting 92. Additive manufacturing techniques are in fact particularly advantageous for producing the body 60 due to the complex geometry of the latter.

In operation, fuel circulates in the primary circuit 62 and is ejected in the form of a jet at the outlet of the fuel ejection nozzle 66, whatever the regime of the turbomachine.

At regimes ranging from cruise flight up to take off, fuel also circulates in the secondary circuit 64. This fuel is rotated and accelerated on passing through the swirler channels 112 forming the secondary fuel swirler 114, and forms, at the outlet thereof, a film of fuel vortexing within the terminal ejection part 68 of the secondary circuit 64.

At these operating regimes, the stream of air rotated by the air inlet swirler 122, and introduced into the annular air injection channel 124, has a sufficient flow rate to shear the film of fuel at the level of the free end 119 of the inner lip 118 and the free end 117 of the outer lip 116.

The invention claimed is:

1. An injector nose for a turbomachine, including a primary fuel circuit terminated by a fuel ejection nozzle defining an injection axis, and a secondary fuel circuit comprising a secondary fuel swirler formed of swirler channels opening into a terminal fuel ejection portion of annular shape arranged around the fuel ejection nozzle, wherein each swirler channel has a passage section which decreases in a direction going from an upstream end to a downstream end of the swirler channel and wherein an entirety of each swirler channel extends along a respective plane forming, with the injection axis, a constant angle comprised between 40 degrees and 60 degrees.

2. The injector nose according to claim 1, in which each swirler channel is curved in the respective plane.

3. The injector nose according to claim 1, in which the secondary fuel circuit comprises a secondary plenum chamber of annular shape connected to the respective upstream ends of the swirler channels.

4. The injector nose according to claim 3, in which the secondary fuel circuit comprises secondary connection channels connecting a tubular channel, centred along the injection axis, to the secondary plenum chamber.

5. The injector nose according to claim 1, further comprising an air inlet swirler supplying an annular air injection channel arranged radially inwards with respect to the terminal fuel ejection portion and cooperating with the terminal fuel ejection portion to form a secondary aerodynamic injector.

6. The injector nose according to claim 5, in which the terminal fuel ejection portion is delimited externally by an outer lip, and is delimited internally by an inner lip which separates the terminal fuel ejection portion from the annular air injection channel.

7. The injector nose according to claim 5, in which the air inlet swirler is formed of air inlet channels having respective inlets opening through a radially outer wall of the injector nose, and respective outlets opening into the annular air injection channel.

8. An injection module for a turbomachine, comprising an injection system, and an injector nose according to claim 1, in which the injection system comprises, from upstream to downstream, a bushing in which is mounted the injector nose, at least one air admission swirler emerging downstream of the injector nose, and a bowl.

9. Turbomachine, comprising at least one injector nose according to claim 1.

* * * * *